United States Patent [19]
Suzuki et al.

[11] Patent Number: 5,575,983
[45] Date of Patent: Nov. 19, 1996

[54] CATALYST FOR PURIFYING EXHAUST GASES AND PROCESS FOR PURIFYING EXHAUST GASES

[75] Inventors: Hiromasa Suzuki, Seto; Koji Yokota; Tomoko Iijima, both of Nagoya; Tadashi Suzuki, Seto; Koichi Kasahara; Syuji Tateishi, both of Ogasa-gun, all of Japan

[73] Assignees: Toyota Jidosha Kabushiki Kaisha; Kabushiki Kaisha Toyota Chuo Kenkyusho, both of Aichi-ken; Cataler Industrial Co., Ltd., Shizuoka-ken, all of Japan

[21] Appl. No.: 311,360

[22] Filed: Sep. 23, 1994

[30] Foreign Application Priority Data

Sep. 24, 1993 [JP] Japan .................................. 5-237612

[51] Int. Cl.$^6$ .................................................... B01J 23/04
[52] U.S. Cl. ................ 423/213.5; 423/236; 423/244.02; 423/239.1
[58] Field of Search ............................ 423/239.1, 245.1, 423/247, 236, 212, 213.2, 239.2, 244.2, 213.5, 244.02; 502/328, 330, 340, 344

[56] References Cited

U.S. PATENT DOCUMENTS

| | | |
|---|---|---|
| 3,931,050 | 1/1976 | Asano et al. . |
| 4,294,726 | 10/1981 | Bozon et al. ............................ 252/462 |
| 4,369,132 | 1/1983 | Kinoshita et al. . |
| 4,480,050 | 10/1984 | Brennan . |
| 4,497,783 | 2/1985 | Barber ...................................... 423/213.5 |
| 4,528,279 | 7/1985 | Suzuki et al. . |
| 4,654,319 | 3/1987 | Kim et al. ................................ 502/304 |
| 4,755,499 | 7/1988 | Neal et al. ............................... 502/415 |
| 4,780,447 | 10/1988 | Kim et al. ................................ 502/243 |
| 4,808,564 | 2/1989 | Matsumoto et al. . |

(List continued on next page.)

FOREIGN PATENT DOCUMENTS

| | | |
|---|---|---|
| 0170841 | 2/1986 | European Pat. Off. . |
| 0298351 | 1/1989 | European Pat. Off. . |
| 0387611 | 9/1990 | European Pat. Off. . |
| 0439010A3 | 7/1991 | European Pat. Off. . |
| 0439010A2 | 7/1991 | European Pat. Off. . |
| 044173A1 | 8/1991 | European Pat. Off. . |
| 0488250A1 | 6/1992 | European Pat. Off. . |
| 0525677A1 | 2/1993 | European Pat. Off. . |
| 0532024A1 | 3/1993 | European Pat. Off. . |
| 2279445 | 2/1976 | France . |
| 3726580A1 | 3/1988 | Germany . |
| 3743626A1 | 7/1988 | Germany . |
| 3803122C1 | 7/1989 | Germany . |
| 4008371A1 | 9/1990 | Germany . |
| 53-19986 | 2/1978 | Japan . |
| 38-03122 | 7/1979 | Japan . |
| 61-111127 | 5/1986 | Japan . |
| 62-117620 | 5/1987 | Japan . |
| 62-106826 | 5/1987 | Japan . |
| 62-97630 | 5/1987 | Japan . |
| 5-168860 | 7/1993 | Japan . |
| 5-317652 | 12/1993 | Japan . |

Primary Examiner—David A. Simmons
Assistant Examiner—Linda L. Gray
Attorney, Agent, or Firm—Oliff & Berridge

[57] ABSTRACT

A process for purifying an exhaust gas comprising carbon monoxide, hydrocarbons, nitrogen oxides, and sulfur oxides by periodically adjusting exhaust gas conditions from lean-burn to fuel-rich and by using a catalyst comprising an alumina support with lithium dissolved therein to form a solid solution, at least one first ingredient selected from the group consisting of platinum and palladium loaded on the alumina support, and at least one second ingredient selected from the group consisting of alkali elements, alkaline-earth elements, and rare-earth elements loaded on the support. Sulfates formed from sulfur oxides in the exhaust gas are decomposed by the lithium under the fuel-rich conditions to inhibit the alumina support from being acidified.

9 Claims, 1 Drawing Sheet

○ : 0 mole/liter Li
● : 0.1 mole/liter Li
□ : 0.4 mole/liter Li
■ : 0.8 mole/liter Li

U.S. PATENT DOCUMENTS

| | | | |
|---|---|---|---|
| 4,849,398 | 7/1989 | Takada et al. | |
| 4,904,633 | 2/1990 | Ohata et al. | 502/304 |
| 5,041,407 | 8/1991 | Williamson et al. | 502/302 |
| 5,075,274 | 12/1991 | Kiyohide et al. | |
| 5,075,275 | 12/1991 | Murakami et al. | 502/303 |
| 5,179,059 | 1/1993 | Domesle et al. | |
| 5,185,305 | 2/1993 | Subramanian et al. | 502/65 |
| 5,208,202 | 5/1993 | Muramatsu et al. | 502/302 |
| 5,208,203 | 5/1993 | Horiuchi et al. | 502/302 |
| 5,236,879 | 8/1993 | Incue et al. | 502/73 |
| 5,268,346 | 12/1993 | Ino et al. | 502/304 |
| 5,271,916 | 12/1993 | Vanderborgh et al. | 423/246 |
| 5,388,406 | 2/1995 | Takeshima et al. | 60/297 |
| 5,412,945 | 5/1995 | Katoh et al. | 502/304 |

○ : 0 mole/ liter Li
● : 0.1 mole/ liter Li
□ : 0.4 mole/ liter Li
■ : 0.8 mole/ liter Li

CATALYST FOR PURIFYING EXHAUST GASES AND PROCESS FOR PURIFYING EXHAUST GASES

BACKGROUND OF THE INVENTION

1. Field of the Invention

The present invention relates to a catalyst for purifying exhaust gases and a process for purifying exhaust gases. More particularly, it relates to the catalyst and the process which can efficiently purify nitrogen oxides ($NO_x$) in the exhaust gases whose oxygen concentrations are at the stoichiometric point or more than required for oxidizing carbon monoxide (CO) and hydrocarbons (HC) therein.

2. Description of Related Art

As catalysts for purifying automotive exhaust gases, there have been employed 3-way catalysts so far which oxidize CO and HC and reduce $NO_x$ simultaneously to purify the exhaust gases. For example, the 3-way catalysts have been known widely which comprise a heat resistant support formed of cordierite, a catalyst carrier layer formed of gamma-alumina and disposed on the support, and a noble metal selected from the group consisting of Pt, Pd and Rh and loaded on the catalyst carrier layer.

The purifying performance of the 3-way catalysts for purifying exhaust gases depends on the air-fuel ratio (A/F) of automotive engine. For instance, when the air-fuel weight ratio is larger than 14.6, i.e., when the fuel concentration is low (or on the fuel-lean side), the oxygen concentration is high in exhaust gases. Accordingly, the oxidation reactions purifying CO and HC are active, but the reduction reactions purifying $NO_x$ are inactive. On the other hand, when the air-fuel ratio is smaller than 14.6, i.e., when the fuel concentration is higher (or on the fuel-rich side), the oxygen concentration is low in exhaust gases. Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even on the fuel-lean side (i.e., in the oxygen-rich atmospheres).

In view of the aforementioned circumstances, the applicants of the present invention applied for a Japanese Patent for a novel catalyst under Japanese Patent Application No. 4-130,904 (Japanese Unexamined Patent Publication (KOKAI) No. 5-317,652). This catalyst comprises an alumina support, and an alkaline-earth metal and Pt loaded on the alumina support. With the catalyst, $NO_x$ is adsorbed on the alkaline-earth elements during the fuel-lean side (i.e., in the oxygen-rich atmospheres) driving. But, on the next fluctuation of the air-fuel ratio to the stoichiometric point or the fuel-rich side (i.e., in the oxygen-lean atmospheres), $NO_x$ is purified by reacting it with the reducing gases such as HC and the like. Thus, the catalyst is superb in the purifying performance of $NO_x$ even on the fuel-lean side (i.e., in the oxygen-rich atmospheres). The catalyst proposed in Japanese Unexamined Patent Publication (KOKAI) No. 5-317,652 is believed to provide the advantageous effect as follows: The alkaline-earth oxides, for example, Ba oxide loaded on the support, react with $NO_x$ to produce nitrates. Thus, $NO_x$ is adsorbed on the support of the catalyst in the form of the barium nitrate.

However, the exhaust gases usually contain $SO_2$ which is produced by burning sulfur (S) contained in the fuel. Further, the catalyst ingredient oxidizes $SO_2$ to $SO_3$ in the oxygen-rich atmospheres (i.e., on the fuel-lean side). Still further, $SO_3$ reacts readily with water also contained in the exhaust gases to produce sulfuric acid. When the resulting sulfuric acid is adsorbed on the support made from alumina, the alumina of the support becomes acidic, and the acidic alumina and the acidic $NO_x$ repel each other. Thus, $NO_x$ is inhibited from adsorbing on the barium. As a result, the catalyst proposed in Japanese Unexamined Patent Publication (KOKAI) No. 5-317,652 suffers from a drawback in that it is deteriorated in terms of the $NO_x$ purifying performance after it is subjected to a durability test.

In order to improve the catalyst proposed in Japanese Unexamined Patent Publication (KOKAI) No. 5-317,652 in terms of the $NO_x$ purifying performance, one can think of decomposing the produced sulfates so as to maintain the $NO_x$ adsorbability of the alkaline-earth metal. In order to decompose the sulfates, for example, aluminum sulfate, it is necessary to heat the catalyst to a high temperature of from about 600° to 700° C. and to hold it in a reducing atmosphere. Such a condition, however, is not practical for automobiles.

In addition, the alkaline-earth metal such as barium and the like is likely to react with alumina at high temperatures. Because of this undesirable property, the catalyst proposed in Japanese Unexamined Patent Publication (KOKAI) No. 5-317,652 suffers from a drawback in that it is poor in terms of the heat resistance.

SUMMARY OF THE INVENTION

The present invention has been developed in view of the aforementioned circumstances. It is therefore an object of the present invention to further improve the catalyst proposed in Japanese Unexamined Patent Publication (KOKAI) No. 5-317,652 in terms of the $NO_x$ purifying performance after it is subjected to a durability test.

In accordance with the present invention, a catalyst can solve the aforementioned problems. A catalyst according to the present invention is for purifying carbon monoxide, hydrocarbons and nitrogen oxides in exhaust gases at the stoichiometric point or in oxygen-rich atmospheres whose oxygen concentrations are more than required for oxidizing the components to be oxidized therein, thereby purifying the exhaust gases, and it comprises:

an alumina support with lithium dissolved therein to form a solid solution;

at least one first ingredient selected from the group consisting of Pt and Pd, and loaded on the alumina support; and at least one second ingredient selected from the group consisting of alkali metals, alkaline-earth metals and rare-earth elements including La, and loaded on the alumina support.

A process according to the present invention is for purifying carbon monoxide, hydrocarbons and nitrogen oxides at the stoichiometric point or in exhaust gases in oxygen-rich atmospheres, thereby purifying the exhaust gases, and it comprises the steps of:

bringing exhaust gases at the stoichiometric point or in oxygen-rich atmospheres whose oxygen concentrations are more than required for oxidizing the components to be oxidized therein into contact with a catalyst:

the catalyst, comprising:

an alumina support with lithium dissolved therein to form a solid solution;

at least one first ingredient selected from the group consisting of Pt and Pd, and loaded on the alumina support; and at least one second ingredient selected from the group consisting of alkali metals, alkaline-earth metals and rare-earth elements including La, and loaded on the alumina support.

Unless otherwise specified, the loading amounts of the first and second ingredients hereinafter mean the amounts thereof loaded on a unit volume of the alumina support and expressed in grams or moles with respect to the unit amount (e.g., 1 mole).

The catalyst employed in the present invention may take any form, e.g., honeycomb-formed cordierite coated with alumina support.

As for the lithium to be dissolved in the alumina support to form a solid solution, it is preferable to dissolve the lithium in the alumina support in an amount of from 0.02 to 0.35 mole, further preferably from 0.05 to 0.24 mole, with respect to 1 mole of alumina.

As for the First ingredient, e.g., Pt, Pd and the mixtures thereof, to be loaded on the alumina support, it is preferable to load the first ingredient on the alumina support in an amount of from 0.1 to 20 g, further preferably from 0.4 to 10 g, with respect to 1 mole of the alumina support.

As for the second ingredient, e.g., alkali metals, alkaline-earth metals, rare-earth metals including La and the mixtures thereof, to be loaded on the alumina support, it is preferable to load the second ingredient on the alumina support in an amount of from 0.1 to 1.2 mole, further preferably from 0.17 to 0.95 mole, with respect to 1 mole of the alumina support.

With the present catalyst, $NO_x$ in the exhaust gases is stored on the second ingredient on the fuel-lean side (i.e., in the oxygen-rich atmospheres). Then, under the air-fuel ratios at the stoichiometric point or less, $NO_x$ is reduced for purification.

The following methods are available for dissolving the lithium in the alumina support to form a solid solution. For example, the lithium can be dissolved in alumina by a coprecipitation process in which activated alumina is generally synthesized. Further, the lithium can be added to and composited with alumina by a sol-gel process. Furthermore, the lithium can be dissolved in alumina to form a solid solution by impregnating an aqueous solution of lithium nitrate into activated alumina and then by calcinating the impregnated alumina at a predetermined temperature of from 600° to 800° C. On the other hand, when lithium oxide, lithium carbonate or the like is mixed with alumina and the mixtures are calcinated, the resulting products are heterogeneous unpreferably. Namely, a part of the lithium can be dissolved in the alumina to form a solid solution, however, the lithium produces detrimental compounds such as $LiAlO_2$ and the like where the lithium exists in higher concentrations with respect to the alumina. As a result, the specific surface area of the alumina is reduced sharply. Hence, it is preferable to employ any one of the aforementioned processes and to uniformly dissolve the lithium in the alumina support to form a solid solution.

In the present catalyst or the catalyst employed by the present exhaust gas purifying process, the lithium is dissolved in the alumina support to form a solid solution. Accordingly, the second ingredient (e.g., alkali metals, alkaline-earth metals, rare-earth metals and the mixtures thereof) is inhibited from reacting with the alumina support. As a result, the present catalyst or the catalyst employed by the present exhaust gas purifying process can exhibit high exhaust gas purifying performance even after it is subjected to a durability test. Hence, it is superb in terms of the heat resistance Moreover, the composite sulfates resulting from the $SO_2$ contained in the exhaust gases are believed to be decomposed by the lithium at low temperatures in the reducing atmospheres, i.e., during the driving at the stoichiometric point or during the driving on the fuel-rich side (i.e., in the oxygen-lean atmospheres). Consequently, the alumina support is inhibited from being acidified by the $SO_2$ contained in the exhaust gases, thereby keeping the $NO_x$ adsorbing ability of the second ingredient (e.g., alkali metals, alkaline-earth metals, rare-earth metals and the mixtures thereof) on the fuel-lean side (i.e., in the oxygen-rich atmospheres). As a result, the present catalyst can exhibit high $NO_x$ purifying performance even after it is subjected to a durability test.

As having been described so far, the present catalyst for purifying exhaust gases can exhibit favorable $NO_x$ purifying performance even after it is subjected to a durability test. In accordance with the present exhaust gas purifying process, $NO_x$ can be purified constantly and efficiently even during driving on the fuel-lean side (i.e., in the oxygen-rich atmospheres).

BRIEF DESCRIPTION OF THE DRAWING

A more complete appreciation of the present invention and many of its advantages will be readily obtained as the same becomes better understood by reference to the following detailed description when considered in connection with the accompanying drawing and detailed specification, all of which forms a part of the disclosure.

DETAILED DESCRIPTION OF THE PREFERRED EMBODIMENTS

Figure 1:
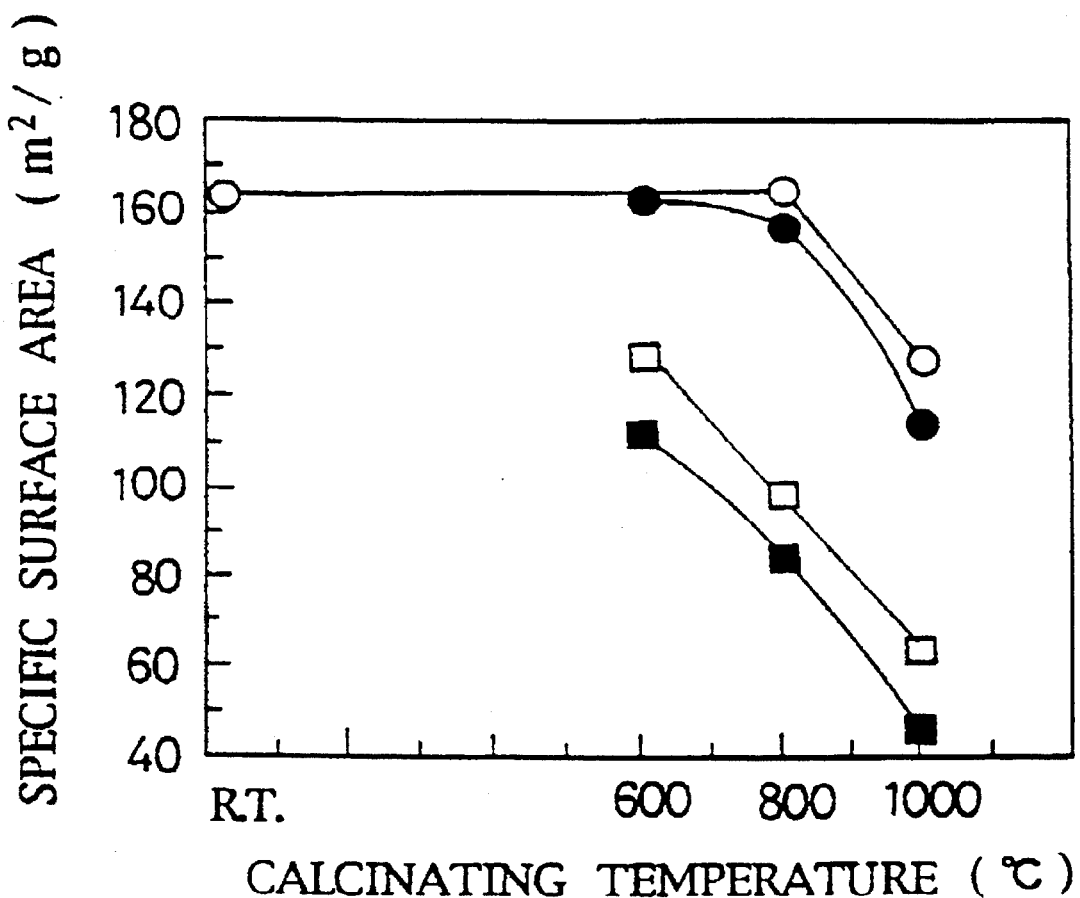
FIG. 1 is a graph for illustrating the relationships between calcinating temperatures and specific surface areas in catalysts having a different lithium dissolving amount.

Having generally described the present invention, a further understanding can be obtained by reference to the specific preferred embodiments which are provided herein for purposes of illustration only and are not intended to limit the scope of the appended claims. Unless otherwise specified, a term, "parts," hereinafter means "parts by weight."

Preparation of Catalyst "A"

100 parts of an alumina powder, 70 parts of alumina sol containing alumina in an amount of 10% by weight, 15 parts of an aqueous aluminum nitrate solution containing aluminum nitrate in an amount of 40% by weight, and 30 parts of water were mixed, thereby preparing a slurry for coating.

Then, a plurality of honeycomb supports formed of cordierite were immersed into the slurry, and thereafter each of them was blown to blow away the slurry in excess. Each of the supports was dried at 80° C. for 20 minutes, and each of them was calcinated at 600° C. for 1 hour, thereby forming an alumina coating layer thereon. The alumina coating layer was thus coated on the honeycomb support in an amount of 120 gram (1.17 mole as $Al_2O_3$) with respect to 1 liter of the honeycomb support, thereby forming an alumina support.

Each of the alumina supports was immersed into an aqueous platinum dinitrodiammine solution having a predetermined concentration or an aqueous palladium nitrate solution having a predetermined concentration, and thereafter it was blown to blow away the water droplets in excess. After the blowing, each of the supports was dried at 250° C. for 1 hour, thereby loading Pt or Pd thereon. The loading amounts of Pt and Pd were 2.0 grams and 5.0 grams with respect to 1 liter of the alumina support, respectively, as set forth in Table 1 below.

Then, each of the thus obtained precursor catalysts was immersed into an aqueous barium acetate solution prepared to have a predetermined concentration. After drying, each of the precursor catalysts was calcinated at 600° C. for 1 hour. The loading amount of barium was 0.3 mole, defined as the metallic content, with respect to 1 liter of the alumina support. Under the calcinating condition to this extent, there occurred no reaction between barium and alumina.

Finally, each of the precursor catalysts with Ba and Pt or Ba and Pd loaded was immersed into an aqueous lithium nitrate solution. The aqueous lithium nitrate solutions were prepared to load the lithium on the precursor catalysts and dissolve the lithium therein in the amounts as set forth in Table 1 below. After drying, each of the precursor catalysts was calcinated at 600° C. for 1 hour, thereby completing four present catalysts having a different lithium dissolving amount and designated at A-1, A-2, A-3 and A-4 in Table 1.

In the present catalysts designated at A-1, A-2, A-3 and A-4, the barium was first loaded on the alumina-coated honeycomb supports, and thereafter the lithium was loaded and dissolved therein to form a solid solution. It should be noted, however, that the lithium can be first loaded thereon and thereafter the barium can be loaded thereon, or that the barium and the lithium can be simultaneously loaded thereon by using a mixed aqueous solution of barium and lithium. Then, the lithium can be dissolved in the alumina coating layer coated on the honeycomb supports by carrying out the calcinating at 600° C. for 1 hour.

Preparation of Catalyst "B"

Alumina powder was impregnated with an aqueous solution of lithium nitrate having a predetermined concentration. After drying, the impregnated alumina was calcinated at 800° C. for 5 hours. Three lithium-dissolved alumina powders were thus prepared.

Each of the three lithium-dissolved alumina powders were made into a slurry. Likewise, each of the slurry was coated on the same honeycomb support as employed in the preparation of the present catalysts designated at A-1, A-2, A-3 and A-4, thereby forming a lithium-dissolved alumina coating layer thereon. The lithium-dissolved alumina coating layer was thus coated on the honeycomb support in an amount of 120 grams with respect to 1 liter of the honeycomb support, thereby forming an alumina support.

Each of the alumina supports was immersed into an aqueous platinum dinitrodiammine solution having a predetermined concentration, and thereafter it was blown to blow away the water droplets in excess. After the blowing, each of the supports was dried at 250° C. for 1 hour, thereby loading Pt thereon. The loading amount of Pt was 2.0 grams with respect to 1 liter of the alumina support as set forth in Table 1 below.

Then, each of the thus obtained precursor catalysts was immersed into an aqueous barium acetate solution prepared to have a predetermined concentration. After drying, each of the precursor catalysts was calcinated at 600° C. for 1 hour, thereby completing three present catalysts having a different lithium dissolving amount and designated at B-1, B-2 and B-3 in Table 1. The loading amount of barium was 0.3 mole, defined as the metallic content, with respect to 1 liter of the alumina support.

Preparation of Catalyst "C"

The present catalyst designated at C-1 in Table 1 was prepared by first compositing alumina with lithium by a sol-gel process.

For example, 3 liters of 2-propanol was placed in a container provided with a stirrer, and it was held at 80° C. in a nitrogen atmosphere. Then, 26.5 grams (approximately 0.25 mole) of lithium acetylacetonate was charged into the container, and the mixture was stirred for 2 hours. Thereafter, 120 grams (approximately 5.88 mole) of aluminum isopropoxide was further charged into the container, and the mixture was further stirred for 2 hours.

Further, a mixed solution including 432 grams of pure water and 2 liters of 2-propanol was dropped at a rate of about 25 milliliters per minute. After the dropping, the resulting mixture was stirred for about 4 hours.

Furthermore, the solvents and water were removed from the reactant solution by using a rotary evaporator. After drying, the reactant was calcinated in air at 600° C. for 5 hours, thereby preparing a lithium-dissolved alumina powder. The resulting lithium-dissolved alumina powder was composed of lithium in an amount of 0.1 mole, defined as the metallic content, with respect to 120 grams of alumina in alumina-lithium solid solution.

The lithium-dissolved alumina powder thus obtained was made into a slurry. Likewise, the slurry was coated on the same honeycomb support as employed in the preparation of the present catalysts designated at A-1, A-2, A-3 and A-4, thereby forming a lithium-dissolved alumina coating layer thereon. The lithium-dissolved alumina coating layer was thus coated on the honeycomb support in an amount of 120 grams with respect to 1 liter of the honeycomb support, thereby forming an alumina support.

The alumina support with the lithium-dissolved alumina coating layer formed thereon was immersed into an aqueous platinum dinitrodiammine solution having a predetermined concentration, and thereafter it was blown to blow away the water droplets in excess. After the blowing, the support was dried at 250° C. for 1 hour, thereby loading Pt thereon. The loading amount of Pt was 2.0 grams with respect to 1 liter of the alumina support as set forth in Table 1 below.

Then, the thus obtained precursor catalyst was immersed into an aqueous barium acetate solution prepared to have a predetermined concentration. After drying, the precursor catalyst was calcinated at 600° C. for 1 hour, thereby completing a present catalyst designated at C-1 in Table 1. The loading amount of barium was 0.3 mole, defined as the metallic content, with respect to 1 liter of the alumina support.

Moreover, the lithium-dissolved alumina powders having a different lithium content were prepared by varying the lithium acetylacetonate concentration. Then, the aforementioned preparation steps were carried out twice, thereby completing two present catalysts having a different lithium dissolving amount and designated at C-2 and C-3 in Table 1.

Preparation of Catalysts "D" and "E"

100 parts of an alumina powder, 70 parts of alumina sol containing alumina in an amount of 10% by weight, 15 parts of an aqueous aluminum nitrate solution containing aluminum nitrate in an amount of 40% by weight, and 30 parts of water were mixed, thereby preparing a slurry for coating.

Then, two honeycomb supports formed of cordierite were immersed into the slurry, and thereafter each of them was blown to blow away the slurry in excess. Each of the supports was dried at 80° C. for 20 minutes, and each of them was calcinated at 600° C. for 1 hour, thereby forming an alumina coating layer thereon. The alumina coating layer was thus coated on the honeycomb support in an amount of 120 grams with respect to 1 liter of the honeycomb support, thereby forming an alumina support.

Each of the alumina supports was immersed into an aqueous platinum dinitrodiammine solution having a predetermined concentration, and thereafter it was blown to blow away the water droplets in excess. After the blowing, each of the supports was dried at 250° C. for 1 hour, thereby loading Pt thereon. The loading amount of Pt was 2.0 grams with respect to 1 liter of the alumina support as set forth in Table 1 below.

Then, one of the thus obtained two precursor catalysts was immersed into an aqueous sodium acetate solution prepared to have a predetermined concentration. The other one of them was immersed into an aqueous lanthanum nitrate solution prepared to have a predetermined concentration. After drying, each of the precursor catalysts was calcinated at 600° C. for 1 hour. Barium and lanthanum were loaded respectively on the precursor catalysts in an amount of 0.3 mole, defined as the metallic contents, with respect to 1 liter of the alumina support.

Finally, each of the precursor catalysts with Pt and Ba or Pt and La loaded was immersed into an aqueous lithium nitrate solution. The aqueous lithium nitrate solution was prepared to load the lithium on the precursor catalysts and dissolve the lithium therein in the amount as set forth in Table 1 below. After drying, each of the precursor catalysts was calcinated at 600° C. for 1 hour, thereby completing two present catalysts designated at D and E in Table 1.

Preparation of Comparative Catalyst Nos. 1 through 7

Except that no lithium was dissolved therein, Comparative Catalyst Nos. 1 through 5 were prepared in the same manner as those of the present catalysts designated at A-1, A-2, A-3 and A-4 until barium, sodium or lanthanum was loaded thereon.

Except that a lithium oxide powder and an alumina powder were mixed to make a slurry, Comparative Catalyst No. 6 was prepared in the same manner as those of the present catalysts designated at A-1, A-2, A-3 and A-4. In Comparative Catalyst No. 6, the lithium was included therein in an amount of 0.1 mole, defined as the metallic content, with respect to 1 liter of the alumina support.

Except that the lithium was dissolved in the alumina support in an amount of 0.8 mole, defined as the metallic content, with respect to 1 liter of the alumina support, Comparative Catalyst No. 7 was prepared in the same manner as those of the present catalysts designated at A-1, A-2, A-3 and A-4.

Examination for Purifying Performance

Each of the present catalysts and the comparative catalysts was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the present catalysts and the comparative catalysts for the conversion of CO, HC and $NO_x$. The results of the evaluation are summarized in the columns designated at "Initial Conversion" in Table 1.

After the aforementioned evaluation, each of the present catalysts and the comparative catalysts was subjected to a bench test on durability which utilized the same type of engine as above. Namely, each of them was disposed in an exhaust line of the engine, and then the engine was run for 50 hours while adjusting the temperature of the exhaust gas introduced into them at 650° C. and keeping the air-fuel ratio

TABLE 1

|  | Dissolving Amount, Li (mole/liter) | Loading Amount, First Catalyst Ingredient (gram/liter) | | Loading Amount, Second Catalyst Ingredient (mole/liter) | | | Initial Conversion (%) | | | Conversion after Durability Test (%) | | |
| --- | --- | --- | --- | --- | --- | --- | --- | --- | --- | --- | --- | --- |
|  | Li | Pt | Pd | Ba | Na | La | NOx | HC | CO | NOx | HC | CO |
| Present Catalyst A-1 | 0.1 | 2.0 | — | 0.3 | — | — | 93 | 97 | 100 | 63 | 88 | 96 |
| Present Catalyst A-2 | 0.2 | 2.0 | — | 0.3 | — | — | 95 | 95 | 100 | 64 | 87 | 95 |
| Present Catalyst A-3 | 0.3 | 2.0 | — | 0.3 | — | — | 94 | 93 | 100 | 62 | 84 | 96 |
| Present Catalyst A-4 | 0.1 | — | 5.0 | 0.3 | — | — | 91 | 96 | 100 | 58 | 92 | 98 |
| Present Catalyst B-1 | 0.1 | 2.0 | — | 0.3 | — | — | 94 | 96 | 100 | 64 | 86 | 98 |
| Present Catalyst B-2 | 0.2 | 2.0 | — | 0.3 | — | — | 92 | 95 | 100 | 63 | 87 | 97 |
| Present Catalyst B-3 | 0.3 | 2.0 | — | 0.3 | — | — | 93 | 93 | 100 | 62 | 86 | 94 |
| Present Catalyst C-1 | 0.1 | 2.0 | — | 0.3 | — | — | 93 | 96 | 100 | 63 | 85 | 96 |
| Present Catalyst C-2 | 0.2 | 2.0 | — | 0.3 | — | — | 92 | 96 | 100 | 66 | 88 | 98 |
| Present Catalyst C-3 | 0.3 | 2.0 | — | 0.3 | — | — | 92 | 93 | 100 | 64 | 84 | 97 |
| Present Catalyst D | 0.1 | 2.0 | — | — | 0.3 | — | 89 | 89 | 100 | 59 | 84 | 95 |
| Present Catalyst E | 0.1 | 2.0 | — | — | — | 0.3 | 70 | 97 | 100 | 54 | 96 | 99 |
| Comp. Catalyst No. 1 | — | 2.0 | — | 0.3 | — | — | 93 | 95 | 100 | 48 | 88 | 98 |
| Comp. Catalyst No. 2 | — | 2.0 | — | 0.3 | — | — | 93 | 93 | 100 | 47 | 86 | 98 |
| Comp. Catalyst No. 3 | — | — | 5.0 | 0.3 | — | — | 90 | 96 | 100 | 46 | 89 | 98 |
| Comp. Catalyst No. 4 | — | 2.0 | — | — | 0.3 | — | 88 | 88 | 100 | 45 | 82 | 96 |
| Comp. Catalyst No. 5 | — | 2.0 | — | — | — | 0.3 | 69 | 98 | 100 | 44 | 95 | 99 |
| Comp. Catalyst No. 6 | 0.1 | 2.0 | — | 0.3 | — | — | 93 | 95 | 100 | 48 | 87 | 98 |
| Comp. Catalyst No. 7 | 0.8 | 2.0 | — | 0.3 | — | — | 95 | 91 | 99 | 48 | 83 | 96 | at 18 (i.e., A/F=18). After this bench test was over, each of them was again disposed in the exhaust line of the actual vehicle. The vehicle was driven in the same manner as described above, thereby examining the present catalysts and the comparative catalysts for the conversion of CO, HC and $NO_x$. The results of the evaluation are summarized in the columns designated at "Conversion after Durability Test" in Table 1. In the purifying performance examinations described above, a fuel was employed in which sulfur was included in an amount of 70 ppm in order to facilitate the catalyst performance deterioration resulting from the sulfur.

Evaluation

It is appreciated from Table 1 that the comparative catalysts exhibited an $NO_x$ conversion of from 44 to 48% after the durability test. On the other hand, all of the present catalysts designated at A-1 through A-4, B-1 through B-3, C-1 through C-3, D and E exhibited an $NO_x$ conversion of 54% or more after the durability test. Even after the durability test, the present catalysts thus maintained the $NO_x$ conversion performance high. This advantageous effect apparently resulted from the fact that the lithium was included in the present catalysts, and that it was dissolved in the alumina coating layer of the present catalysts to form a solid solution of lithium and alumina.

In particular, Comparative Catalyst No. 7 exhibited a considerably deteriorated $NO_x$ conversion performance after the durability test. This disadvantageous effect is believed to result from the fact that the lithium and the alumina were reacted with each ocher to produce $LiAlO_2$, and that the alumina consequently came to exhibit a sharply decreasing specific surface area as illustrated in FIG. 1.

In addition, FIG. 1 illustrates that the specific surface area of the alumina supports was decreased by dissolving the lithium therein, and that the larger the lithium was dissolved in the alumina supports, the more their specific surface areas were decreased. Especially, in Comparative Catalyst No. 7, the lithium dissolving amount was 0.8 mole with respect to 1 liter of the alumina support. It is believed that, in Comparative Example No. 7, the specific surface area of the alumina support was decreased, as shown in FIG. 1, to as low as 100 $m^2/g$ by the durability test in which Comparative Catalyst No. 7 was heated at 650° C. As can be appreciated from FIG. 1, it is preferred that the lithium dissolving amount be 0.4 mole or less with respect to 1 liter of the alumina support.

Having now fully described the present invention, it will be apparent to one of ordinary skill in the art that many changes and modifications can be made thereto without departing from the spirit or scope of the present invention as set forth herein including the appended claims.

What is claimed is:

1. A process for purifying an exhaust gas from a lean-burn engine comprising sulfur oxides, carbon monoxide, hydrocarbons and nitrogen oxides, said process comprising:

bringing said exhaust gas into contact with an exhaust gas purifying catalyst comprising:

a support comprising a solid solution comprising alumina with lithium dissolved therein in an amount of from 0.02 to 0.35 of lithium with respect to one mole of alumina;

at least one first ingredient selected from the group consisting of Pt and Pd, and loaded on said support; and at least one second ingredient selected from the group consisting of alkali metals, alkaline-earth metals and rare-earth elements, and loaded on said support, wherein (1) under a lean-burn atmosphere in which oxygen concentrations are above a neutral point that is required for oxidizing components to be oxidized in said exhaust gas, nitrogen oxides in said exhaust gas are adsorbed to said at least one second ingredient and sulfur oxides in said exhaust gas react to form composite sulfates, (2) said exhaust gas is periodically adjusted from lean-burn to fuel-rich, providing a reduction atmosphere in which oxygen concentrations are not greater than said neutral point and (3) under said reduction atmosphere, nitrogen oxides adsorbed to said second ingredient are chemically reduced by a reaction with hydrocarbons and carbon monoxide in said exhaust gas and said composite sulfates decompose due to the presence of lithium therein at temperatures sufficiently low to avoid poisoning said catalyst.

2. The process according to claim 1, wherein said lithium is dissolved in said alumina to form said solid solution in an amount of from 0.05 to 0.24 mole of lithium with respect to 1 mole of alumina.

3. The process according to claim 1, wherein said first ingredient is loaded on said support in an amount of from 0.1 to 20 g of said first ingredient with respect to 1 mole of said support.

4. The process according to claim 3, wherein said first ingredient is loaded on said support in an amount of from 0.4 to 10 g of said first ingredient with respect to 1 mole of said support.

5. The process according to claim 1, wherein said second ingredient is loaded on said support in an amount of from 0.1 to 1.2 mole of said second ingredient with respect to 1 mole of said support.

6. The process according to claim 5, wherein said second ingredient is loaded on said support in an amount of from 0.17 to 0.95 mole of said second ingredient with respect to 1 mole of said support.

7. The process according to claim 1, wherein said solid solution is formed by dissolving the lithium in the alumina in the form of an aqueous solution and calcinating the aqueous solution at a temperature of not less than 600° C.

8. The process according to claim 1, wherein said exhaust gas from a lean burn engine has an air/fuel ratio of at least 18.

9. The process according to claim 8, wherein said exhaust gas from a lean burn engine has an air/fuel ratio from 18 to 24.

* * * * *